(12) United States Patent
Tsuda (10) Patent No.: US 7,314,303 B2
(45) Date of Patent: Jan. 1, 2008

(54) ASSISTANT LIGHT SOURCE AND FRONT-LIGHT

(75) Inventor: Akimitsu Tsuda, Miki (JP)

(73) Assignee: TPO Hong Kong Holding Limited, Shatin (HK)

( * ) Notice: Subject to any disclaimer, the term of this patent is extended or adjusted under 35 U.S.C. 154(b) by 0 days.

(21) Appl. No.: 10/537,519

(22) PCT Filed: Dec. 1, 2003

(86) PCT No.: PCT/IB03/05724

§ 371 (c)(1),
(2), (4) Date: Jun. 3, 2005

(87) PCT Pub. No.: WO2004/057383

PCT Pub. Date: Jul. 8, 2004

(65) Prior Publication Data

US 2006/0050531 A1    Mar. 9, 2006

(30) Foreign Application Priority Data

Dec. 20, 2002  (JP) ............................. 2002-370805

(51) Int. Cl.
*F21V 8/00* (2006.01)

(52) U.S. Cl. ...................... 362/626; 362/561; 362/555; 362/612; 362/625; 362/611

(58) Field of Classification Search .................. 362/31, 362/561, 560, 559, 555, 625, 626, 623, 612, 362/613
See application file for complete search history.

(56) References Cited

U.S. PATENT DOCUMENTS

| 6,068,382 | A | 5/2000 | Fukui et al. |
| 6,659,615 | B2* | 12/2003 | Umemoto .................... 362/600 |
| 6,712,492 | B2* | 3/2004 | Shimura et al. ............. 362/558 |
| 6,729,737 | B2* | 5/2004 | Jeon et al. ................... 362/617 |
| 6,883,924 | B2* | 4/2005 | Maeda et al. ................ 362/612 |
| 7,040,796 | B2* | 5/2006 | Sugiura et al. ............. 362/608 |

FOREIGN PATENT DOCUMENTS

| CN | 1177120 | 3/1998 |
| CN | 1356582 | 7/2002 |
| EP | 1126213 | 8/2001 |
| JP | 08304629 | 11/1996 |
| JP | 2001-124930 | 5/2001 |
| WO | WO95 32390 | 11/1995 |

\* cited by examiner

*Primary Examiner*—Laura K. Tso
(74) *Attorney, Agent, or Firm*—Liu & Liu (57) ABSTRACT

To provide an assistant light source and a front-light emitting light to the light guide plate efficiently. A sectional shape of prism 14a in the center of light stick is isosceles triangle having a tip angle (T°) of 100° and a tilt angle ($a_1$) of 40°. The depth of the prism 14a is $D_1$ μm. A sectional shape of prism 14b in a ¼ position from an end of light stick is triangle having a tip angle (T°) of 100° and a tilt angle ($a_2$) of 34.8°. The depth of the prism 14b is $D_2$ μm. A sectional shape of prism 14c in an end of light stick is triangle having a tip angle (T°) of 100° and a tilt angle ($a_3$) of 24.05°. The depth of the prism 14c is $D_3$ μm.

18 Claims, 5 Drawing Sheets

ASSISTANT LIGHT SOURCE AND FRONT-LIGHT

BACKGROUND OF THE INVENTION

1. Field of the Invention

The present invention relates to an assistant light source and front-light, particularly to an assistant light source and front-light having a function of changing light of spot light source to light of line light source.

2. Description of Related Art

A reflective or transflective liquid crystal display device includes a liquid crystal cell having a pair of opposed substrates and a liquid crystal layer sandwiched between these opposed substrates, and has a so-called display function in a reflective mode in which an image is displayed using external light. This type of device displays an image in the same reflective mode even if external light is weak, and it is therefore provided with a front-light which is a surface illumination apparatus supplying light to the liquid crystal cell from the display side of the liquid crystal cell.

This front-light principally comprises a light guide placed facing and substantially in parallel to the surface on the display side of the liquid crystal cell, and an edge-light (side light), placed at end faces of the light guide, for emitting light to the end face. The light from the edge-light transmits through the light guide, with its propagation direction changed to the underside of the light guide facing the liquid crystal cell in the light guide, that is, the surface of the display side of the liquid crystal cell and enters the liquid crystal cell.

The edge-light is an assistant light source for the front-light and principally comprises an elongated cylindrical light stick for introducing light into the light guide and a spot light source arranged on both sides of the light stick, for emitting light to the light stick. As the spot light source, an LED is normally used. The edge-light in such a configuration converts light from the LED which is a spot light source to light from a line light source by the light stick and guides the converted light to the light guide.

The light stick in the edge-light is provided with a plurality of prisms on the face opposed to the end face of the light guide and the light from the edge-light is emitted substantially perpendicular to the end face of the light guide through these prisms (Japanese Laid-Open Patent Publication No. 2001-345006 (paragraph numbers [0004] and [0005])).

However, it is an actual situation that the conventional edge-light which is an assistant light source for a front-light is unable to emit light substantially perpendicular to the light guide from the light emitting face of the light stick. Therefore, the conventional edge-light cannot emit light to the light guide efficiently.

SUMMARY OF THE INVENTION

The present invention has been implemented in view of such a problem and it is an object of the present invention to provide an assistant light source capable of emitting light to a light guide plate efficiently and a front-light using the assistant light source.

The assistant light source of the present invention comprises an elongated light stick having a reflecting prism face with a plurality of prisms and having a light emitting face opposed to the reflecting prism face, wherein an incident light is transmitted inside thereof, the transmitted light is reflected on the reflecting prism face, and the reflected light is emitted from the light emitting face and light generating means arranged on both sides of the light stick for generating the light for emitting to the light stick, wherein the plurality of prisms has a sectional shape in consideration of path in direct light from the light generating means and path in light reflected on the light emitting face.

According to this configuration, the plurality of prisms formed on the reflecting prism face of the light stick has a sectional shape in consideration of path in direct light from the light generating means and path in light reflected on the light emitting face, and it is thereby possible to emit not only the direct light from the light generating means but also the reflected light from the light generating means reflected on the light emitting face to the light guide substantially perpendicular to the light emitting face and as a consequence emit light from the light stick to the light guide efficiently.

In the assistant light source of the present invention, the sectional shape is preferably substantially triangle shape having one tip angle and two tilt angles, wherein the tip angle is constant in each prism, and wherein the tilt angles are different from each other in each prism.

In the assistant light source of the present invention, prism in the center of the light stick has preferably substantially isosceles triangle shape.

In the assistant light source of the present invention, the tip angle (T°) is preferably calculated by formula (1) as follows;

$$T=180-2\times(45-\tfrac{1}{2}\times\tan^{-1}(3W/L)) \qquad \text{formula (1)}$$

where L represents the length of the light stick, and W represents the width of the light stick.

In the assistant light source of the present invention, a smaller tilt angle (a(X)°) is preferably calculated by formula (2) as follows;

$$a(X)=45-\tfrac{1}{2}\times\tan^{-1}(W/2X) \qquad \text{formula (2)}$$

where W represents the width of the light stick and X represents a distance from an end of the light stick to a specific prism.

In the assistant light source of the present invention, a tilt angle (a(X)°) closer to an end of the light stick is preferably calculated by formula (3) as follows;

$$a(X)=45-\tfrac{1}{2}\times\tan^{-1}(3W/2X) \qquad \text{formula (3)}$$

where W represents the width of the light stick and X represents a distance from an end of the light stick to a specific prism.

In the assistant light source of the present invention, a tilt angle (a(X)°) of prism closer to an end of the light stick is preferably calculated by formula (2) and a tilt angle (a(X)°) of prism in the center of the light stick is calculated by formula (3).

In the assistant light source of the present invention, a tilt angle (a(X)°) of prism susceptible to the direct light is preferably calculated by formula (2) and a tilt angle (a(X)°) of prism susceptible to the light reflected on the light emitting face is calculated by formula (3).

In the assistant light source of the present invention, a tilt angle (a(X)°) of prism in area of X<2 mm is preferably constant.

In the assistant light source of the present invention, the depth (D μm) of the plurality of prisms is preferably calculated by formula (4) to formula (6) as follows;

(N=1 to 17)

$$D(N)=24.3 \qquad \text{formula (4)}$$

(N=18 to 28)

$$D(N)=1.5 \times N-1.2 \qquad \text{formula (5)}$$

(N=29 to 85) (center of light stick)

$$D(N)=0.6 \times N+24 \qquad \text{formula (6)}$$

where N represents the number of prisms from an end of the light stick.

In the assistant light source of the present invention, a reflective metal film is preferably formed on the reflecting prism face.

In the assistant light source of the present invention, the light stick preferably has an adjustment area Y in which prisms using the tilt angle calculated by formula (2) and prisms using the tilt angle calculated by formula (3) are formed alternately.

The front-light of the present invention is characterized by comprising the above described assistant light source and a light guide for emitting light emitted from the assistant light source as light of a surface light source.

According to this configuration, the assistant light source can emit light to the light guide efficiently and thereby emit light to the liquid crystal cell efficiently.

The liquid crystal display device of the present invention is characterized by comprising a liquid crystal cell having a reflecting member and the above described front-light for supplying light to the liquid crystal cell.

According to this configuration, the front-light can emit light to the liquid crystal cell efficiently and thereby improve the light utilization efficiency in the liquid crystal cell and suppress power consumption to a low level.

DESCRIPTION OF THE PREFERRED EMBODIMENT(S)

The present inventor has noticed the fact that when light is emitted to a light guide from an assistant light source comprising an elongated light stick having a reflecting prism face and light emitting face, and light generating means arranged on both sides of the light stick, some part of the light emitted to the light guide is emitted from the light generating means and directly reflected on the reflecting prism face and the other part of the light is emitted from the light generating means, reflected on the light emitting face and then reflected on the reflecting prism face. Then, the present inventor has come up with the present invention by discovering that by determining a sectional shape of the prism in consideration of the tip angle, tilt angles and depth of the prism, it is possible to emit two light rays to the light guide efficiently.

That is, the subject matter of the present invention is to realize an assistant light source capable of emitting light to a light guide efficiently by comprising a light stick having a reflecting prism face with a plurality of prisms and having light emitting face opposed to the reflecting prism face and light generating means for generating the light for emitting to the light stick, wherein the plurality of prisms has a sectional shape in consideration of path in direct light from the light generating means and path in light reflected on the light emitting face.

With reference now to the attached drawings, an embodiment of the present invention will be explained in detail below.

Figure 1:
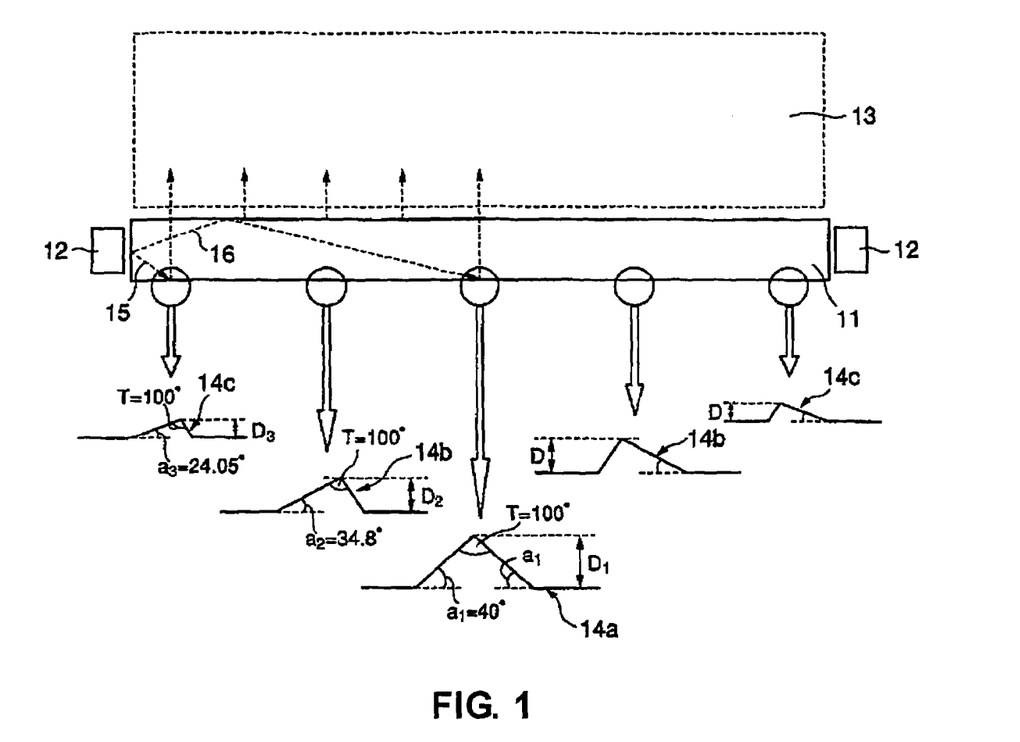
FIG. 1 is a view showing one arrangement of a front-light with an assistant light source according to Embodiment of the present invention.

FIG. 1 is a view showing one arrangement of a front-light with an assistant light source according to an embodiment of the present invention.

The front-light shown in FIG. 1 principally comprises an assistant light source made up of a light stick (light pipe) 11 having an elongated cylindrical shape, and LEDs 12 which is light generating means arranged on both sides of the light stick 11, and a light guide 13 which guides the light from this assistant light source to the liquid crystal cell.

The light stick 11 is provided with a reflecting prism face 11*a* opposed to the light guide 13 and a light emitting face 11*b* opposed to the reflecting prism face 11*a* (the side closer to the light guide 13). This reflecting prism face 11*a* is provided with a plurality of prisms 14 (14*a* to 14*c*) at predetermined intervals. Furthermore, the reflecting prism face 11*a* is provided with a reflective metal film for reflecting the light from the LED 12 or light reflected on the light emitting face 11*b*. As the reflective metal film, a metal film such as an Al film can be used.

When the prism line of the light stick 11 can be observed on the front-light, it is also possible to mix diffusion particles such as metal particles having high reflectance such as Al with the material of the light stick 11. This can broaden the light emitted from the light stick 11 and make it difficult to see the prism line. It is also possible to arrange a diffusion sheet over the light emitting face 11*b* of the light stick 11 instead of mixing diffusion particles with the material of the light stick 11.

The sectional shape of the plurality of prisms 14 formed on the reflecting prism face 11*a* is determined in consideration of the optical path in the direct light from the LEDs and the optical path in the light from the LEDs reflected on the light emitting face. That is, in FIG. 1, when light is emitted from the LED 12 to the light guide 13, there are two light rays, one from the LED 12 directing directly to the reflecting prism face 11*a* and the other from the LED 12 reflected on the light emitting face 11*b* and directed to the reflecting prism face 11*a*. To guide light to the light guide 13 efficiently, it is necessary to determine the sectional shape of the prisms in consideration of these two optical paths.

Thus, when the optical path of the light 16 which is emitted from the LED 12, reflected on the light emitting face 11*b* and then directed to the reflecting prism face 11*a* is considered, the length and width of the light stick 11 and the depth of the prism influence the sectional shape of the prism 14. Therefore, in consideration of these factors, the sectional shape of the prism 14 formed on the reflecting prism face 11*a* is determined individually.

For example, as shown in FIG. 1, the sectional shape of the prism 14*a* substantially in the center is an isosceles triangle having a tip angle (T°) of 100° and a tilt angle ($a_1$) of 40°. The depth of this prism 14*a* is ($D_1$ μm). Furthermore, as shown in FIG. 1, the sectional shape of the prism 14*b* at a ¼ position from an end of the light stick is a triangle having a tip angle (T°) of 100° and a tilt angle ($a_2$) of 34.8°. The depth of this prism 14*b* is ($D_2$ μm). Furthermore, as shown in FIG. 1, the sectional shape of the prism 14*c* at an end of the light stick is a triangle having a tip angle (T°) of 100° and a tilt angle ($a_3$) of 24.05°. The depth of this prism 14*c* is ($D_3$ μm). That is, tip angles of all the prisms 14 are the same and tilt angles of the prisms 14 are set so as to increase from a position closer to the LED 12 to the center. Furthermore, the depth of the prism is set to as to increase from a position closer to the LED 12 to the center.

The tip angle, tilt angle and depth of the prisms 14 can be calculated based on the following formulae. These formulae are obtained in consideration of the optical path of the light 16 which is emitted from the LED 12, reflected on the light emitting face 11*b* and then directed to the reflecting prism face 11*a*. This allows the sectional shapes of the individual prisms 14 to be obtained.

The tip angle (T°) can be calculated from the following formula (1) where L represents the length of the light stick and W represents the width of the light stick.

$$T = 180 - 2 \times (45 - \tfrac{1}{2} \times \tan^{-1}(3W/L)) \quad \text{formula (1)}$$

The smaller tilt angle (a(X)°) of the tilt angles is calculated by formula (2) as follows;

$$a(X) = 45 - \tfrac{1}{2} \times \tan^{-1}(W/2X) \quad \text{formula (2)}$$

where W represents the width of the light stick and X represents a distance from an end of the light stick to a specific prism.

Furthermore, the smaller tilt angle (a(X)°) of the tilt angles is calculated by formula (3) as follows;

$$a(X) = 45 - \tfrac{1}{2} \times \tan^{-1}(3W/2X) \quad \text{formula (3)}$$

where W represents the width of the light stick and X represents a distance from an end of the light stick to a specific prism.

Both formula (2) and formula (3) show tilt angles (a(X)°) of the prism and formula (2) is a calculation formula of the tilt angle (a(X)°) of the prism in consideration of the direct light from the LED and formula (3) is a calculation formula of the tilt angle (a(X)°) of the prism in consideration of the light reflected on the light emitting face.

In the light stick, the influence of the direct light is relatively great on an area closer to an end of the light stick, while the influence of the reflected light is relatively great on an area in the center of the light stick. Therefore, depending on the influence of the direct light or reflected light, the tilt angle (a(X)°) of the prism is calculated using formula (2) or formula (3) as appropriate. That is, the tilt angle (a(X)°) of the prism close to an end of the light stick is calculated by formula (2) and the tilt angle (a(X)°) of the prism close to the center of the light stick is calculated by formula (3).

In an area closer to an end of the light stick of X<2 mm, the tilt angle (a(X)°) of the prism may also be kept constant. When the tilt angle (a(X)°) of the prism is too small, processing of the light stick becomes difficult, and therefore keeping constant the tilt angle (a(X)°) of the prism in an area closer to an end of the light stick can make processing of the light stick easier.

The depth (D μm) of the plurality of prisms is calculated by formula (4) to formula (6) as follows;

(N=1 to 17)

$$D(N) = 24.3 \quad \text{formula (4)}$$

(N=18 to 28)

$$D(N) = 1.5 \times N - 1.2 \quad \text{formula (5)}$$

(N=29 to 85) (center of light stick)

$$D(N) = 0.6 \times N + 24 \quad \text{formula (6)}$$

where N represents the number of prism from an end of the light stick.

In the assistant light source in the above described configuration, the light from the LED 12 is transmitted in the light stick 11, reflected on the reflecting prism face 11*a* and emitted from the light emitting face 11*b* to the light guide 13. In this case, since prisms having sectional shapes in consideration of optical paths of the direct light from the LED and the light from the LED reflected on the light emitting face are formed, it is possible to emit not only the direct light from the LED but also the light from the LED reflected on the light emitting face to the light guide substantially perpendicular to the light emitting face, and as a result, it is possible to emit light from the light stick to the light guide sufficiently. Furthermore, the assistant light source can emit light to the light guide efficiently and thereby emit light to the liquid crystal cell efficiently.

An embodiment which has been carried out to confirm the effect of the present invention will be explained.

Figure 2:
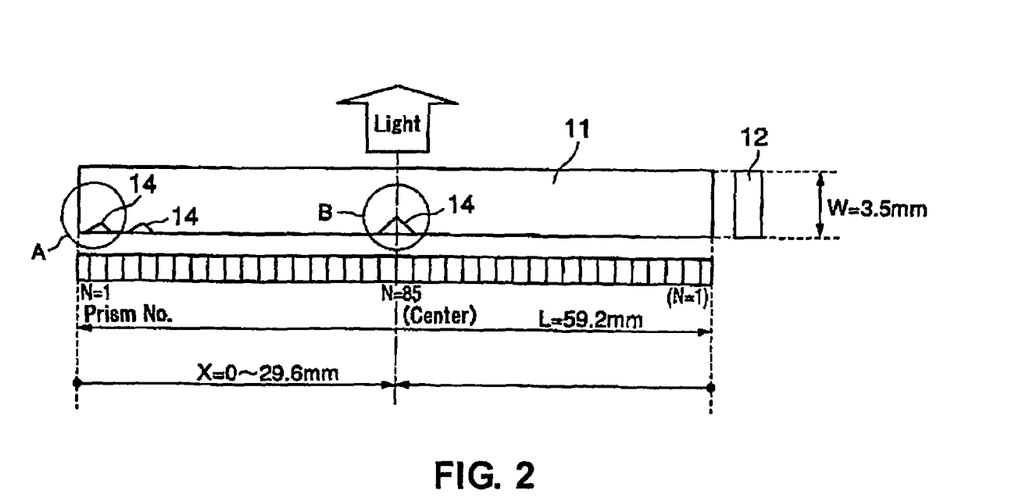
FIG. 2 is a view showing a position of prism in an assistant light source according to Embodiment of the present invention.
Figure 3:
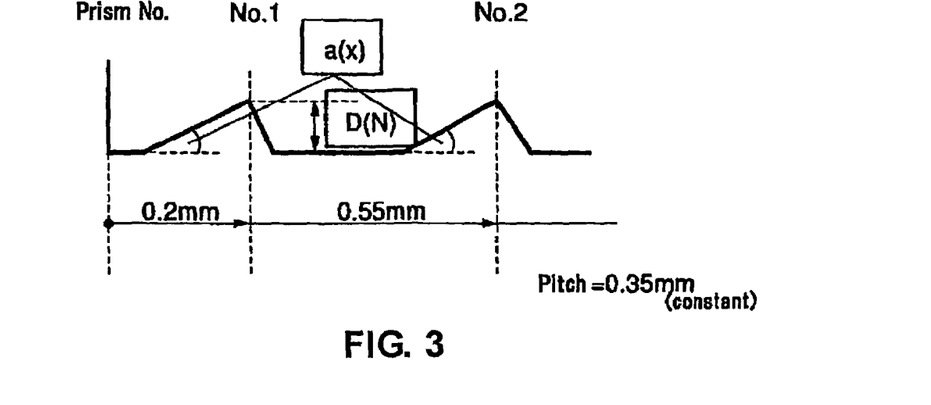
FIG. 3 is a magnified view of A portion in FIG. 2.
Figure 4:
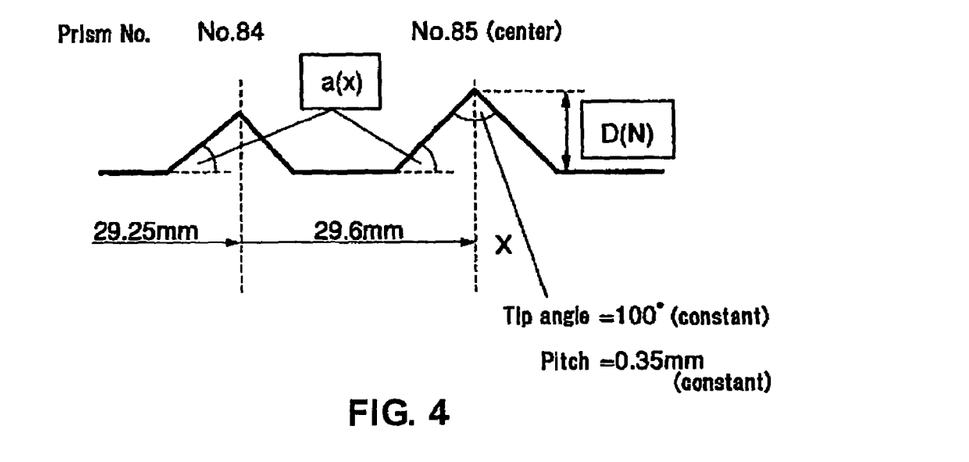
FIG. 4 is a magnified view of B portion in FIG. 2.

FIG. 2 illustrates the positions of the prisms of the assistant light source according to the embodiment of the present invention and FIG. 3 is an enlarged view of part A in FIG. 2 and FIG. 4 is an enlarged view of part B in FIG. 2.

The light stick 11 shown in FIG. 2 has 169 prisms 14 on the reflecting prism face. These prisms 14 are numbered from an end of the light stick 11 to the center as N=1, 2, . . . , 84, 85 and so on. The length of the light stick 11 is 59.2 mm and the width of the light stick 11 is 3.5 mm. The pitch between prisms is fixed at 0.35 mm.

In such a light stick 11, the sectional shape of the prism 14 is determined by determining the tip angle, tilt angles and depth by formula (1) to formula (6). For example, the tip angle is fixed at 100°, the tilt angle is 24.05° for prism No. 1 and 40° for prism No. 85. The depth is 24.3 μm for prism No. 1 and 75 μm for prism No. 85.

Figure 5:
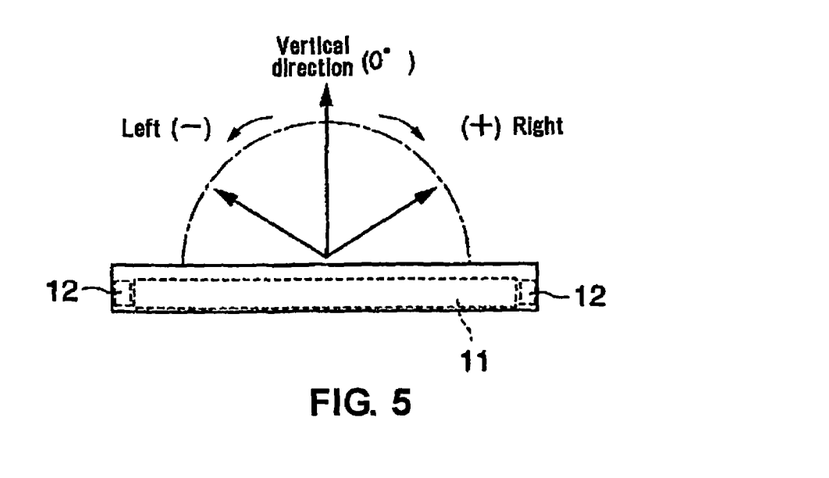
FIG. 5 is a view showing a left-right angle in inspecting an effect of an assistant light source according to the present invention.

With regard to the assistant light source having the light stick 11 shown in FIG. 2, an analysis is made by simulation as to whether light is emitted perpendicular to the light guide or not. More specifically, light emitted in the vertical direction was evaluated by calculating its intensity (cd) as a parameter. In this case, as shown in FIG. 5, the rightward tilting direction from the vertical position (0°) is regarded as (+) and leftward tilting direction is regarded as (−).

Figure 7:
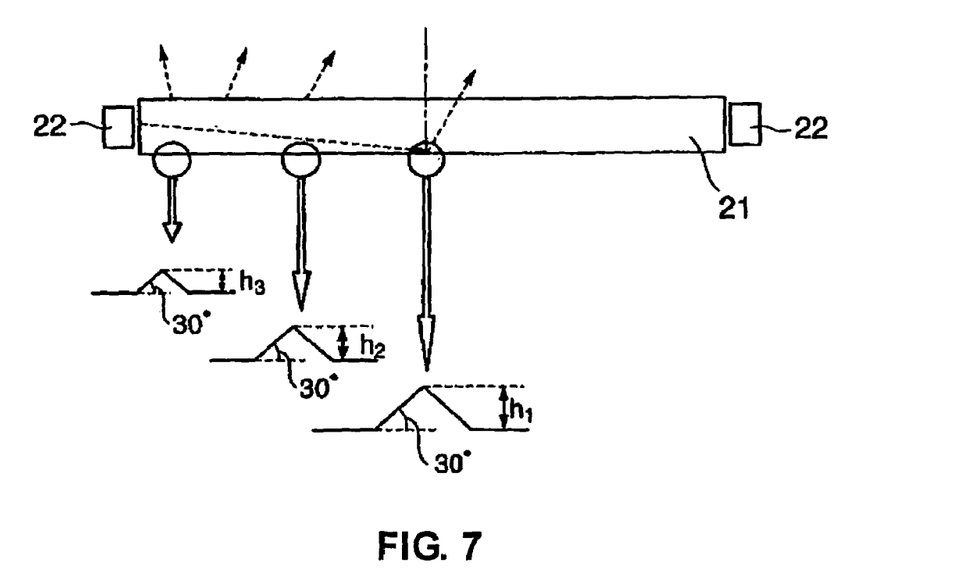
FIG. 7 is a view showing a prism in an assistant light source of a comparable example.

Furthermore, as a comparative example, a simulation was conducted as shown in FIG. 7 using an assistant light source provided with a light stick 21 having a plurality of prisms with different heights ($h_1$ to $h_3$) similar to each other in their sectional shapes (tip angle of 120°, tilt angle of 30°) and LEDs 22 arranged at both ends.

Figure 6:
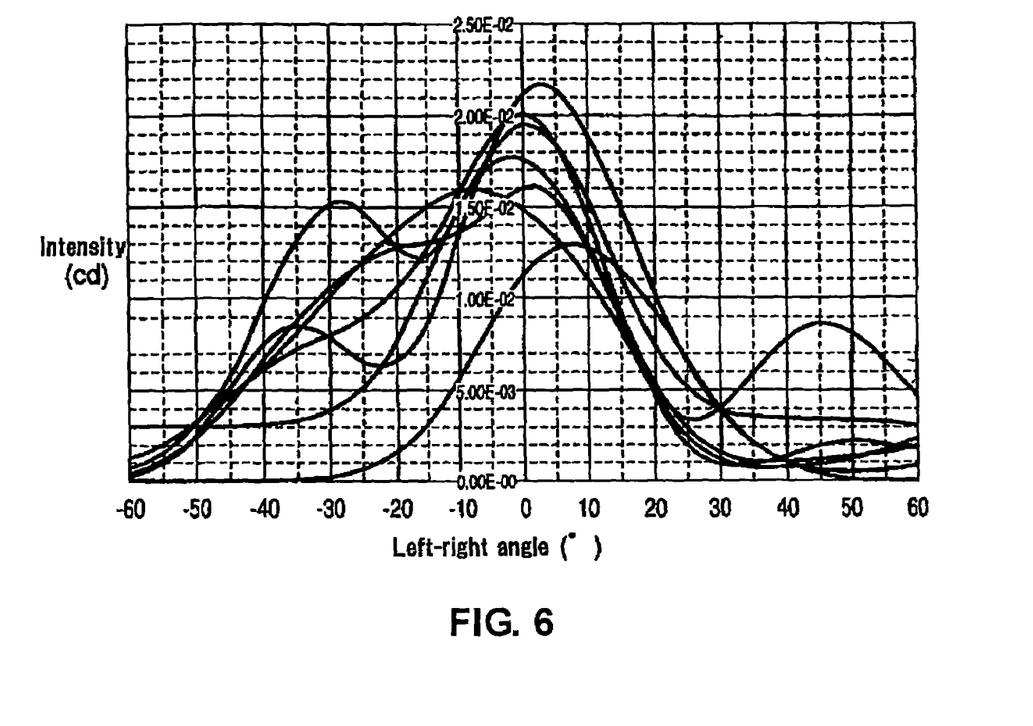
FIG. 6 is a view showing a result of the left-right angle in the assistant light source according to the present invention.
Figure 8:
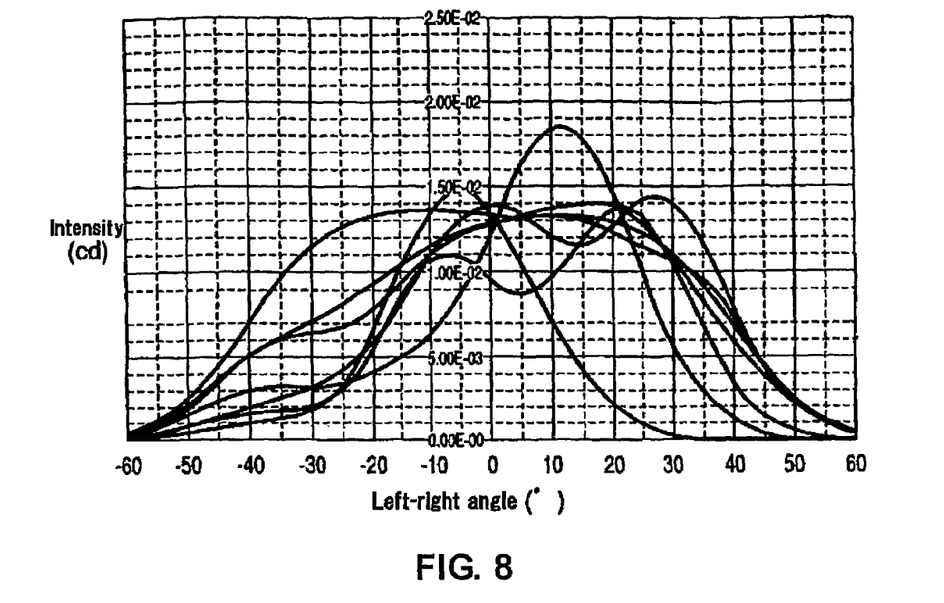
FIG. 8 is a view showing a result of the left-right angle in the assistant light source of a comparable example.

Judging from the simulation result, as is apparent from FIG. 6, the assistant light source of the present invention can emit light from the LED 12 substantially vertically. Furthermore, it is appreciated that the overall intensity of light is also high. Therefore, the assistant light source of the present invention can emit a large amount of light to the light guide efficiently. On the other hand, the assistant light source in the comparative example contains light shifted rightward about 10° and has relatively low intensity as is apparent from FIG. 8. For this reason, this assistant light source cannot emit light to the light guide efficiently.

Figure 9:
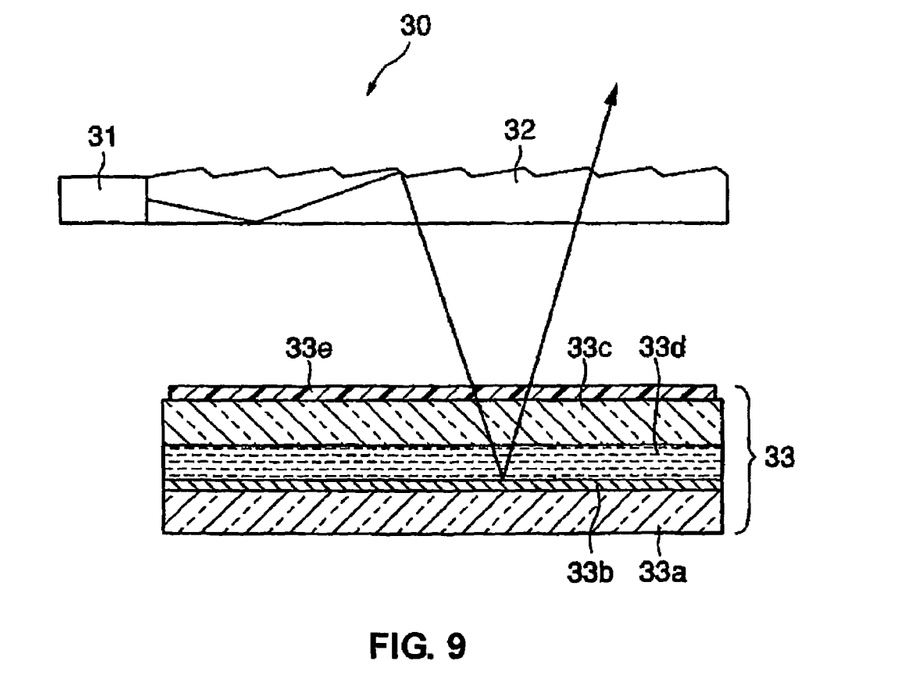
FIG. 9 is a sectional view showing an arrangement of a liquid crystal display device with a front-light having an assistant light source according to the present invention.

Then, a case where the front-light having such an assistant light source is applied to a liquid crystal display device will be explained. FIG. 9 is a sectional view showing a schematic configuration of the liquid crystal display device provided with the front-light having the assistant light source of the present invention.

Here, a case where the liquid crystal display device is a reflective liquid crystal display device will be explained. In FIG. 9, there are actually electronic elements and optical elements such as an electrode and color filter, but these are omitted for simplicity of explanation.

The liquid crystal display device shown in FIG. 9 principally comprises a liquid crystal cell 33 and a front-light 30 which is a surface illumination apparatus to supply light to this liquid crystal cell 33. The front-light 30 principally comprises an assistant light source 31 according to the present invention and a light guide 32 which guides light from the assistant light source 31 to the liquid crystal cell 33.

The light guide 32 has a shape alternating between a mountain-like part and valley-like part. This shape is formed by repeating a combination of a relatively gentle slope having a relatively large area in the direction in which the light guide extends and a relatively steep slope having a relatively small area in the same direction. The longitudinal direction a groove (groove direction) made up of neighboring mountain-like parts is substantially perpendicular to the direction in which the light guide 32 extends.

The liquid crystal cell 33 principally comprises a pair of glass substrates 33a and 33c opposed to each other and a liquid crystal layer 33d placed between the two glass substrates. A reflector 33b which is a light reflecting member is provided in an area which is on the glass substrate 33a and contacts the liquid crystal layer 33d. As this reflector 33b, it is possible to use a metal thin film, etc., and the metal thin film can be formed on the glass substrate 33b using a physical method such as sputtering.

A polarizing plate 33e is arranged on the surface which is on the other glass substrate 33c and does not contact the liquid crystal layer 33d. The polarizing plate 33e can be arranged by pasting it onto the surface of the glass substrate 33c. With regard to the liquid crystal cell 33, the same one used for a reflective liquid crystal display device can be used.

The liquid crystal cell 33 configured in this way is arranged at a predetermined distance from the front-light 30. That is, the liquid crystal cell 33 and front-light 30 are arranged in such a way that the surface of the polarizing plate 33e of the liquid crystal cell 33 is opposed to the light emitting face of the front-light 30.

In the liquid crystal display device in the above-described configuration, the light emitted from the LED of the assistant light source 31 is reflected on the reflective film within the light stick and emitted to the light guide 32.

The light from the front-light 30 is emitted to an end face of the light guide 32. The light guide 32 transmits the incident light inside. In the process of this transmission, the light is reflected on the steep slope of the light guide 32, with its propagation direction greatly changed, and emitted from the bottom face (light emitting face) of the light guide 32 to the liquid crystal cell 33.

The light emitted from the front-light 30 is transmitted through the polarizing plate 33e, glass substrate 33c and liquid crystal layer 33d, reflected on the reflector 33b, transmitted through the liquid crystal layer 33d, glass substrate 33c and polarizing plate 33e, further transmitted through the light guide 32 of the front-light 30 and emitted to the outside. This provides a display in the reflective mode.

As shown above, in the liquid crystal display device provided with the front-light having the assistant light source of the present invention, the assistant light source can emit light to the light guide efficiently and thereby emit light to the liquid crystal cell efficiently. This improves the light utilization efficiency of the liquid crystal cell and can thereby suppress power consumption to a low level.

Figure 10:
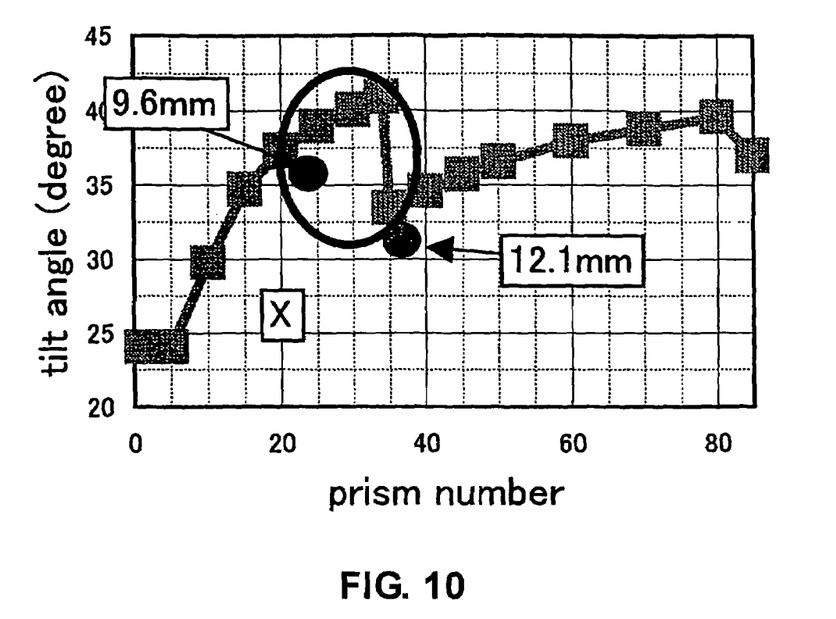
FIG. 10 illustrates a change of a tilt angle in an assistant light source according to the present invention.
Figure 11:
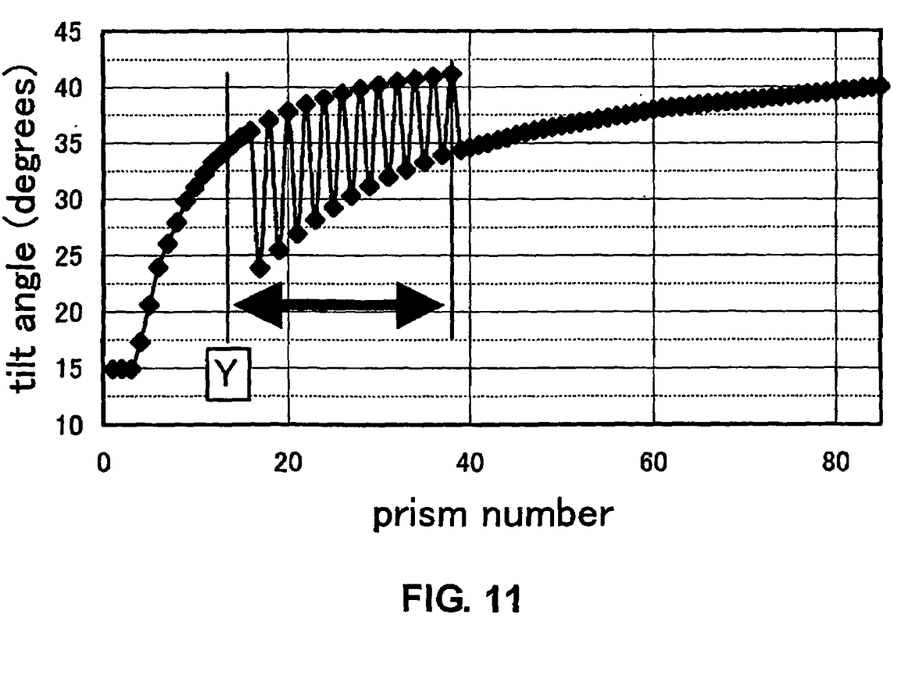
FIG. 11 illustrates an adjustment area in an assistant light source according to the present invention.

As described above, the present invention acquires the tilt angle depending on the distance from an end of the light stick to a specific prism according to formula (2) or formula (3). In this case, as shown in FIG. 10, there is a prism position at which the tilt angle changes drastically (part X in FIG. 10). At this time, as shown in FIG. 11, it is preferable to provide an adjustment area Y in which prisms using the tilt angle calculated by formula (2) and the tilt angle calculated by formula (3) are formed alternately. Providing such an adjustment area Y makes it possible to improve the uniformity of light over the entire light stick.

This adjustment area Y preferably has a distance X from an end of the light stick to a specific prism of 5 mm to 15 mm. For example, as shown in FIG. 2, when the prism number in the center is 85, the adjustment area Y is preferably provided from prism number approximately 15 to prism number approximately 40.

The present invention is not limited to the above-described embodiment, but can be implemented modified in various ways. For example, without being particularly limited to values used as the tip angle and tilt angles of the prism, the pitch of the prism, the depth of the prism or the number of prisms of the above described embodiment, the present invention can be implemented modified as appropriate. Furthermore, the angles can be determined within an allowable range of set values±several degrees.

The formulae in the above-described embodiment are applicable to a light stick having a length of approximately 60 mm (for PDA) and for other applications, it is necessary to use different formulae independently in consideration of two optical paths. However, the present invention is also applicable to any light stick having a length other than 60 mm.

The above-described embodiment has described the case where the present invention is applied to the front-light, but the present invention can also be applied to a back-light.

As explained above, the plurality of prisms formed on the reflecting prism face of the light stick has a sectional shape in consideration of optical paths of direct light from the light generating means and light reflected on the light emitting face. This allows not only the direct light from the light generating means but also the light from the light generating means reflected on the light emitting face to be emitted to the light guide in substantially perpendicular to the light emitting face, and can thereby emit light from the light stick to the light guide efficiently.

The invention claimed is:

1. An assistant light source, comprising:
   an elongated light stick having a reflecting prism face with a plurality of prisms and having light emitting face opposed to said reflecting prism face, wherein an incident light is transmitted inside thereof, the transmitted light is reflected on said reflecting prism face, and the reflected light is emitted from said light emitting face; and
   light generating means arranged on both sides of said light stick for generating the light for emitting to said light stick;
   wherein said plurality of prisms has a sectional shape in consideration of path in direct light from said light generating means and path in light reflected on said light emitting face,
   wherein said sectional shape is substantially triangle shape having one tip angle and two tilt angles, and wherein the tilt angles are different from each other within each prism.

2. An assistant light source according to claim 1, wherein at least one of the sectional shapes is of substantially non-isosceles triangle shape.

3. An assistant light source according to claim 1, wherein prism in the center of said light stick has substantially isosceles triangle shape.

4. An assistant light source according to claim 1, wherein said tip angle is calculated as follows;

$$T=180-2\times(45-\tfrac{1}{2}\times\tan^{-1}(3W/L))$$

where L represents the length of said light stick, and W represents the width of said light stick.

5. An assistant light source according to claim 1, wherein a smaller tilt angle is calculated as follows;

$$a(X)=45-\tfrac{1}{2}\times\tan^{-1}(W/2X)$$

where W represents the width of said light stick and X represents a distance from an end of said light stick to a prism.

6. An assistant light source according to claim 1, wherein a tilt angle closer to an end of said light stick is calculated as follows;

$$a(X)=45-\tfrac{1}{2}\times\tan^{-1}(3W/2X)$$

where W represents the width of said light stick and X represents a distance from an end of said light stick to a prism.

7. An assistant light source according to claim 1, wherein a tilt angle of prism closer to an end of said light stick is calculated as follows;

$$a(X)=45-\tfrac{1}{2}\times\tan^{-1}(W/2X);\text{ and}$$

a tilt angle (a(X)°) of prism in the center of said light stick is calculated as follows;

$$a(X)=45-\tfrac{1}{2}\times\tan^{-1}(3W/2X)$$

where W represents the width of said light stick and X represents a distance from an end of said light stick to a prism.

8. An assistant light source according to claim 1, wherein a tilt angle of prism susceptible to said direct light from said light generating means is calculated as follows:

$$a(X)=45-\tfrac{1}{2}\times\tan^{-1}(W/2X)\text{ and};$$

a tilt angle of prism susceptible to the light reflected on the light emitting face is calculated as follows $a(X)=45-\tfrac{1}{2}\times\tan^{-1}(3W/2X)$ where W represents the width of said light stick and X represents a distance from an end of said light stick to a prism.

9. An assistant light source according to claim 5, wherein a tilt angle of prism in area of X<2 mm is constant.

10. An assistant light source according to claim 1, wherein the depth of the plurality of prisms is calculated as follows;

(N=1 to 17)

$$D(N)=24.3$$

(N=18 to 28)

$$D(N)=1.5\times N-1.2$$

(N=29 to 85) (center of light stick)

$$D(N)=0.6\times N+24$$

where N represents the number of prisms from an end of said light stick.

11. An assistant light source according to claim 1, wherein a reflective metal film is formed on said reflecting prism face.

12. An assistant light source according to claim 1, wherein said light stick has an adjustment area Y in which prisms using the tilt angle calculated as follows:

$$a(X)=45-\tfrac{1}{2}\times\tan^{-1}(W/2X)\text{ and};$$

prisms using the tilt angle calculated as follows;

$$a(X)=45-\tfrac{1}{2}\times\tan^{-1}(3W/2X)\text{ are formed alternately as light of a surface light source;}$$

where W represents the width of said light stick and X represents a distance from an end of said light stick to a prism.

13. A front-light comprising an assistant light source according to claim 1; and a light guide plate for emitting light emitted from said assistant light source as light of a surface light source.

14. A liquid crystal display device comprising: a liquid crystal cell having a reflecting member; and the front-light according to claim 13 for supplying light to said liquid crystal cell.

15. An assistant light source according to claim 1, wherein the reflective prism face comprises a flat surface and the plurality of prisms distributed across the flat surface.

16. An assistant light source according to claim 1, wherein the tip angle is constant for each prism.

17. An assistant light source according to claim 16, wherein the reflective prism face comprises a flat surface and the plurality of prisms distributed across the flat surface.

18. An assistant light source according to claim 2, wherein all the sectional shapes are of substantially non-isosceles triangle shape.

* * * * *